July 6, 1937.   E. P. MOSES   2,085,762
HOPPER CAR UNDERFRAME STRUCTURE
Filed July 7, 1934   6 Sheets-Sheet 1
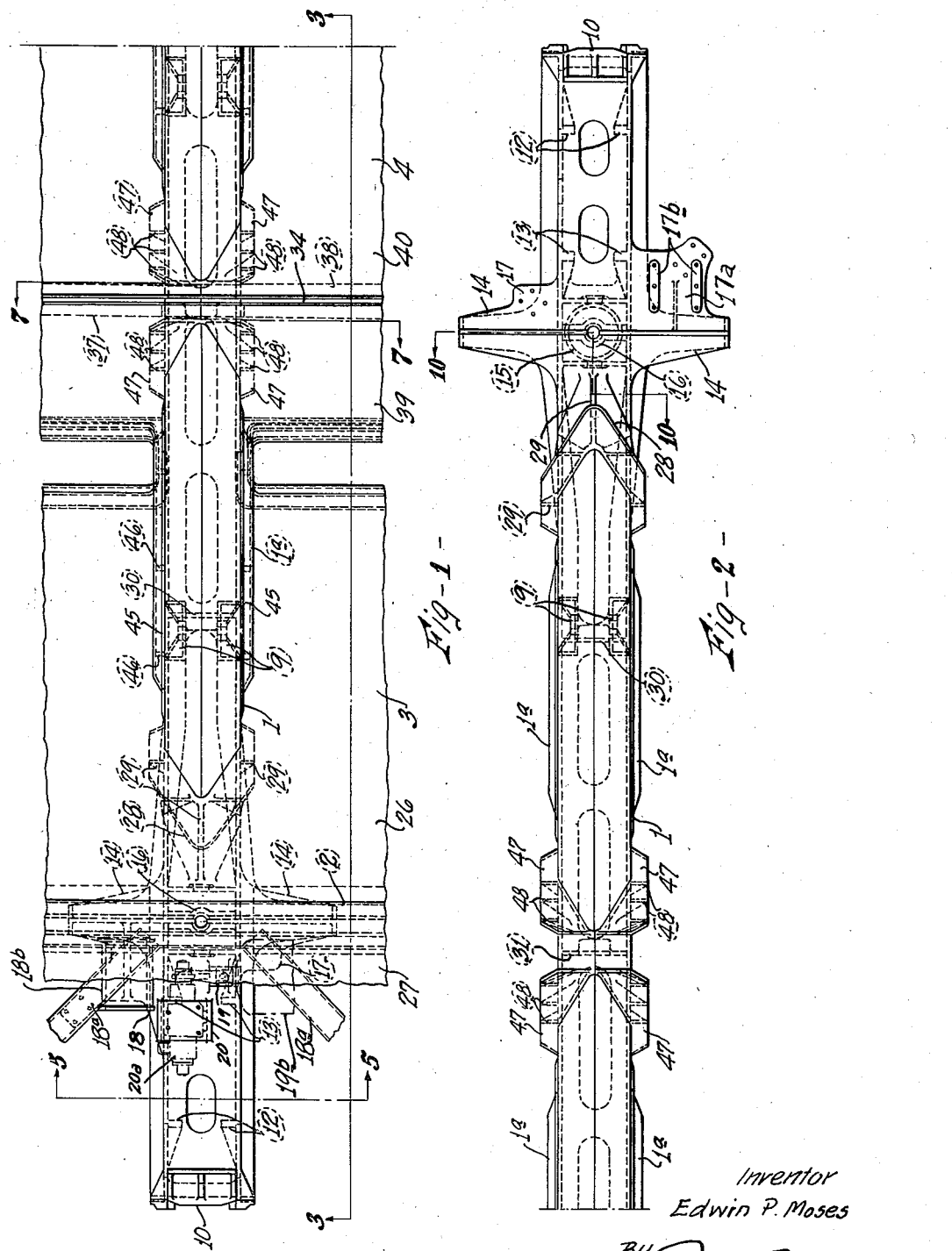
Inventor
Edwin P. Moses
By Rodney Bedell
Attorney

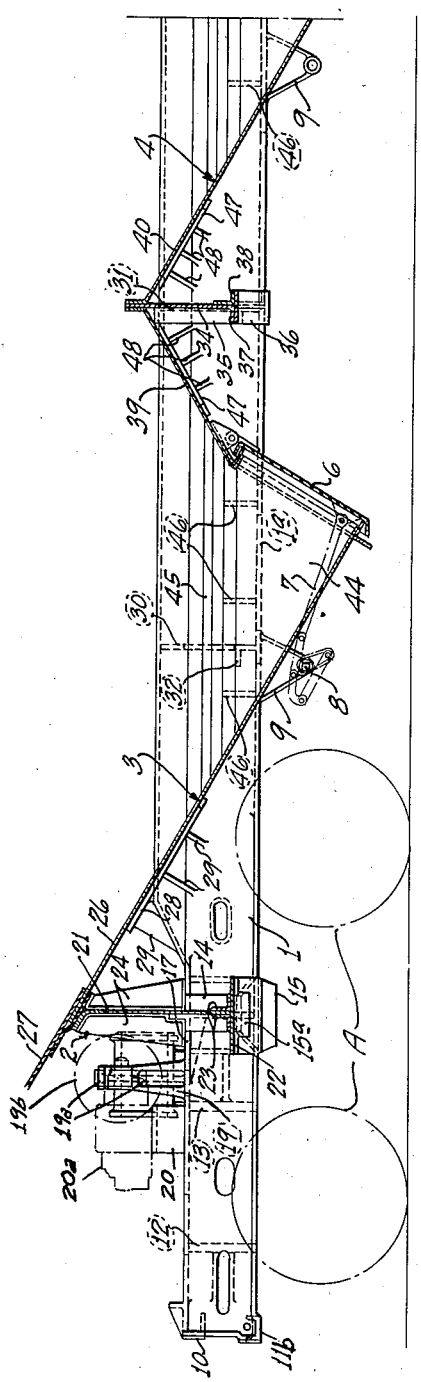

July 6, 1937. E. P. MOSES 2,085,762
HOPPER CAR UNDERFRAME STRUCTURE
Filed July 7, 1934 6 Sheets-Sheet 3
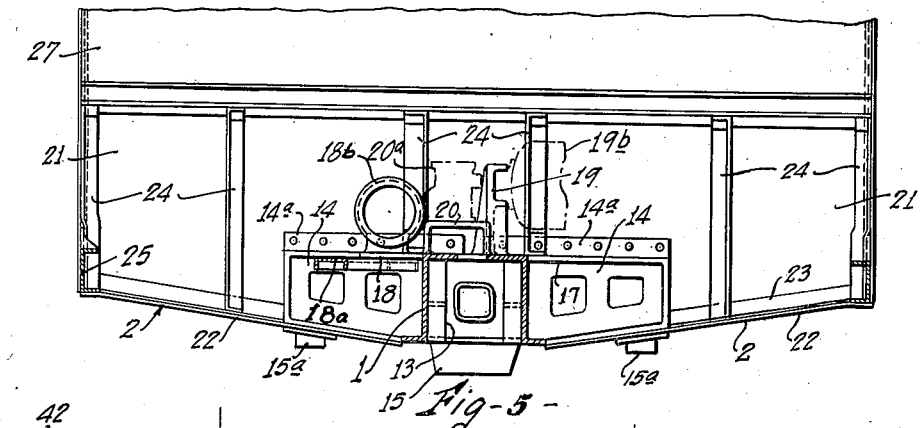
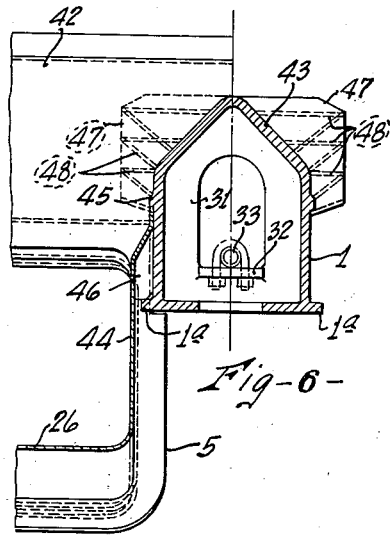
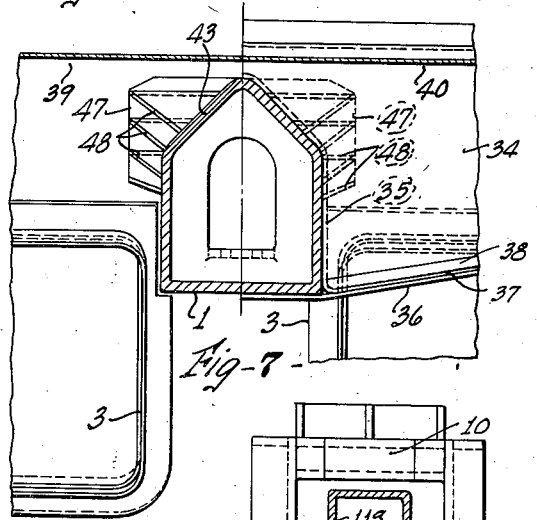
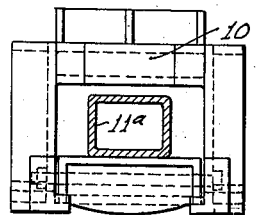
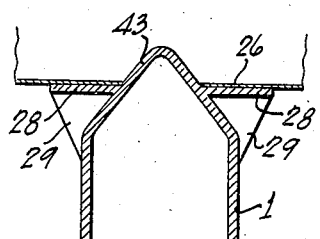
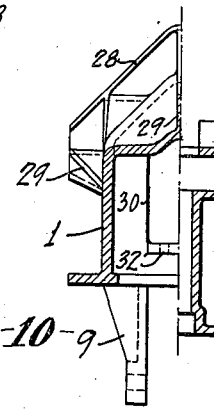
Inventor
Edwin P. Moses.
By Rodney Bedell
Attorney

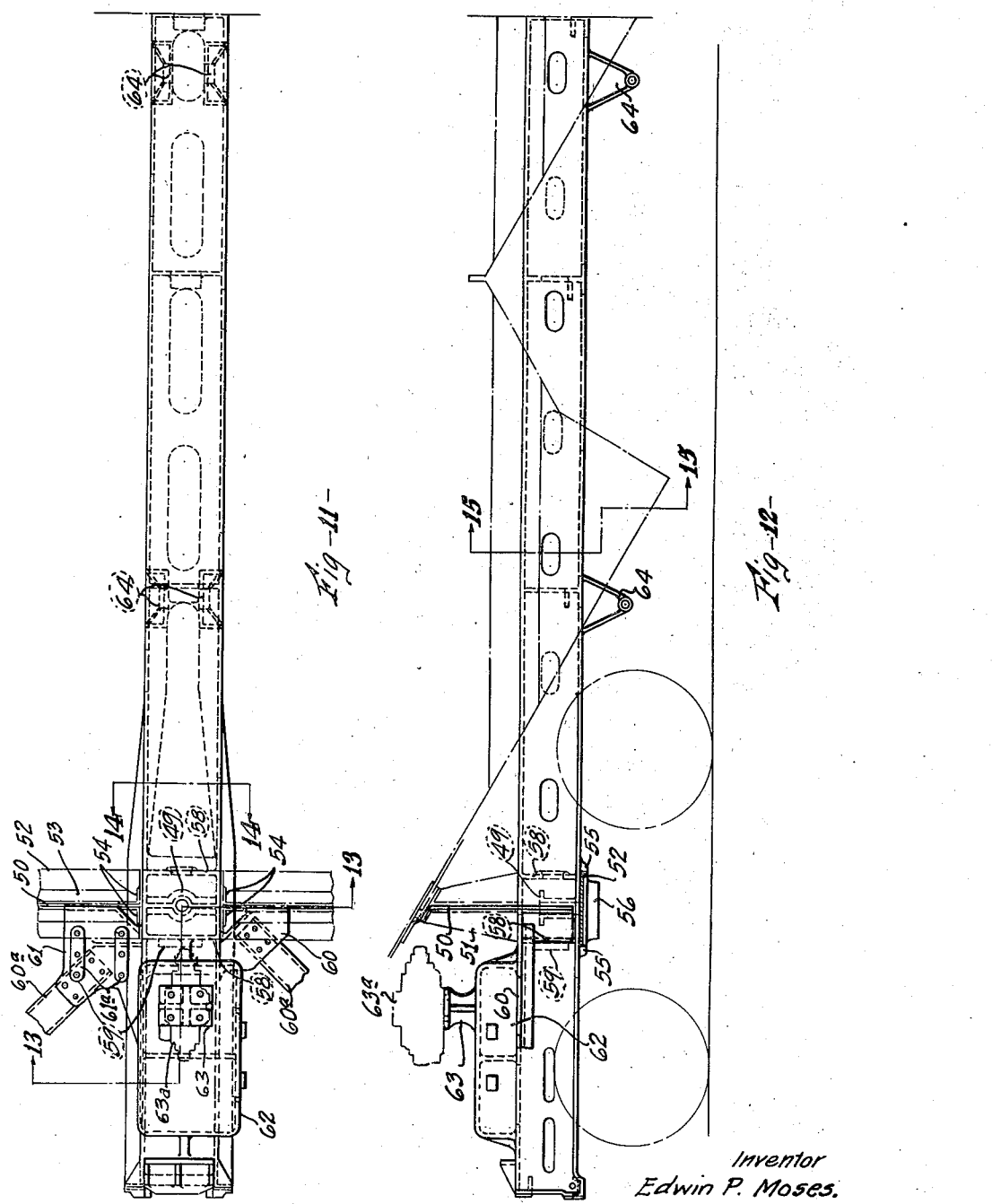

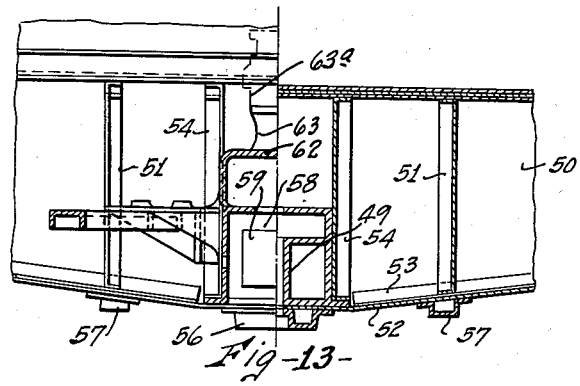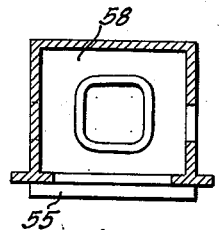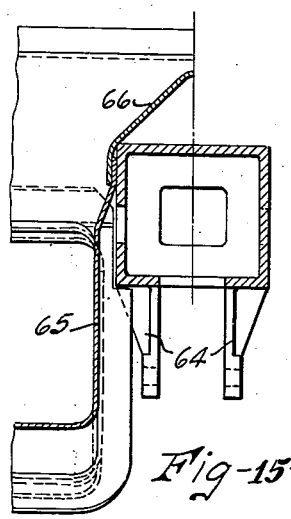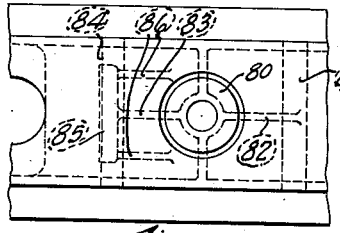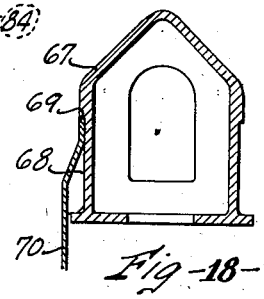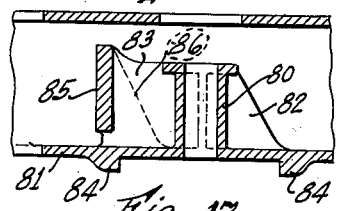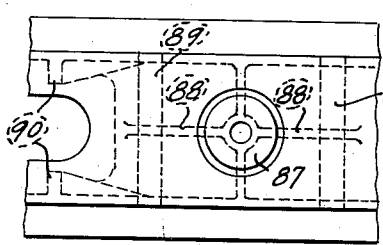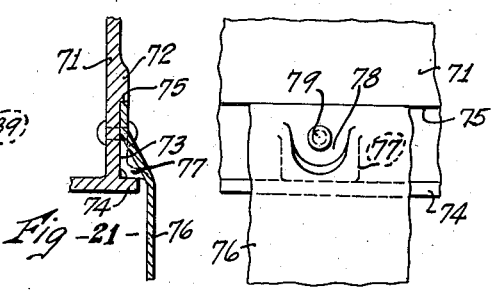

July 6, 1937.  E. P. MOSES  2,085,762
HOPPER CAR UNDERFRAME STRUCTURE
Filed July 7, 1934   6 Sheets-Sheet 6
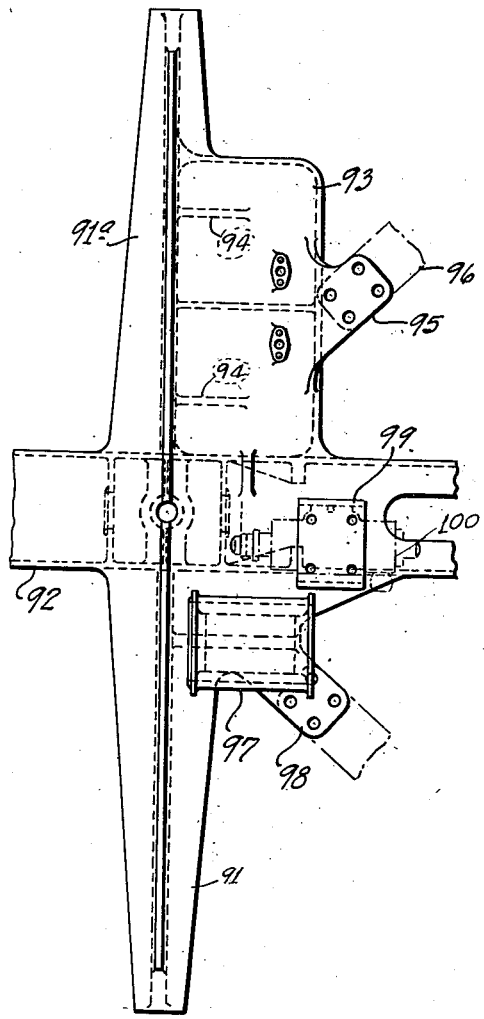
Fig-23-
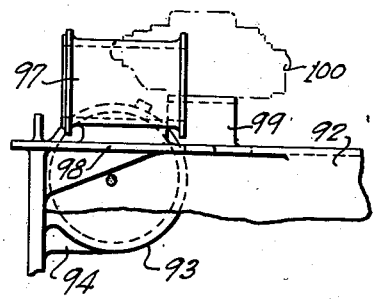
Fig-24-
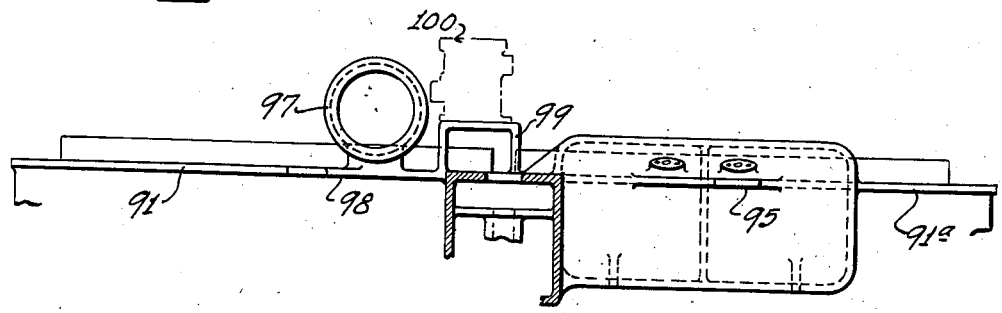
Fig-25-
Inventor
Edwin P. Moses.
By Rodney Bedell
Attorney Patented July 6, 1937

2,085,762

UNITED STATES PATENT OFFICE 2,085,762

HOPPER CAR UNDERFRAME STRUCTURE

Edwin P. Moses, White Plains, N. Y.

Application July 7, 1934, Serial No. 734,080

5 Claims. (Cl. 105—249)

This invention relates to underframe construction for railway rolling stock and particularly hopper cars, although certain features thereof are applicable to other types of railway vehicles.

The center sill in hopper cars is subjected to varying forces adjacent the draft gearing, center plates, and hoppers and, on account of the difference in conditions to be met, a center sill vertical web of uniform section extending from end to end of the underframe must necessarily have flanges. When the flanges are inturned, they must be coped to provide necessary draft gear clearances. When the flanges are turned outward, presenting generally satisfactory conditions at the draft gear and bolster center filler locations, difficulties are encountered at the hopper locations and the widths of the hoppers are restricted unless portions of the out-turned flanges are cut away. Any coping of the flanges either at the ends of the car or in the hopper zone generally requires reinforcement to compensate for the reduction in area and strength of the combined section.

Where open hopper cars are used for transporting coal, sulphur, and other materials which combine with moisture and atmospheric gases to form corrosive substances, the portions of the center sill within the hoppers are exposed to the action of these substances. Cast steel, of which the novel center sill structures herein described are preferably formed, is substantially more resistant to corrosion of the type referred to than rolled members assembled to form the center sills in some hopper cars. Also the absence of gaping crevices between parts bolted and riveted together, into which gritty and corrosive material may seep or work, further provides for increased durability and resistance to corrosion and weathering influences in the present structures.

The formation of the entire hopper car underframe as an integral unit has been suggested. In these structures the transverse members intersecting the center sill as well as the side and end sills frequently are not subjected to substantial portions of the draft and buffing forces on the underframe and these may be of relatively light construction. In some instances it is desirable to form the transoms and side and end sills separately and secure these to the center sill.

An important object of the present invention is to form a hopper car center sill structure designed to meet the special conditions referred to above and having means for attachment thereto of the hopper walls.

Another object is to form a novel bolster and center bearing structure, the bolster serving to support the end wall of the end hopper and a portion of the bolster being formed integral with the center sill.

Another object is to form hopper door operating brackets as integral parts of the center sill.

Another object is to form the brake operating cylinder, reservoir, and air brake valve base or bracket integral with the center sill and bolster arms.

Another object is to provide convenient means for attaching and supporting the brake cylinder and reservoir on the center sill or bolster where these members are not cast integral.

Another object is to provide an integral center sill structure for hopper cars having metal disposed in the most economical fashion to withstand various loads applied to different parts of the center sill and sufficiently flexible to meet varying conditions in other parts of the car.

These objects and others are attained by the structures illustrated in the accompanying drawings in which—

Figure 1 is a partial top view of a longitudinal half of a hopper car illustrating the invention, a portion of the hopper wall or floor being broken away.

Figure 2 is a top view of the other longitudinal half of the underframe but showing the center sill construction only.

Figure 3 is a vertical longitudinal section taken on the line 3—3 of Figure 1.

Figure 4 is a similar section taken on the longitudinal center line of the structure in Figure 2.

Figures 5 and 7 are vertical transverse sections taken on the corresponding section lines of Figure 1.

Figure 6 is a vertical transverse section taken on the line 6—6 of Figure 4.

Figure 8 is an end view of the structure in Figure 2 and showing the coupler shank in section.

Figure 9 is a detail section taken on the inclined line 9—9 of Figure 4.

Figure 10 is a vertical transverse section taken on the line 10—10 of Figure 2.

Figure 11 is a top view showing the left longitudinal half of a modified form of center sill.

Figure 12 is a side view of the same corresponding to Figure 3.

Figures 13 and 14 are vertical transverse sections taken on the corresponding section lines of Figure 11, Figure 13 showing other portions of the underframing attached to the center sill.

Figure 15 is a vertical transverse section taken on the broken line 15—15 of Figure 12.

Figure 16 is a detail top view of a portion of the center sill embodying a modified form of center bearing structure.

Figure 17 is a vertical section taken on the longitudinal center line of Figure 16.

Figure 18 is a vertical transverse section corresponding substantially to Figure 6 but showing another modified form of center sill.

Figures 19 and 20 are top and vertical longitudinal sectional views corresponding respectively to Figure 16 and 17 but showing another form of the center bearing structure.

Figure 21 is a detail vertical transverse section showing modified means of attaching a hopper side wall to the center sill.

Figure 22 is a side view of the structure in Figure 21.

Figure 23 is a partial top view showing still another form of the invention.

Figure 24 is a side view of the same.

Figure 25 is a section on the line 25—25 of Figure 23.

In Figures 1 to 10, the underframe includes an integral center sill structure 1 extending from end to end of the underframe, the built-up bolster structures generally indicated at 2, and built-up transoms to be referred to hereafter.

At each side of the center sill are the hoppers 3, 4 and 5 formed of plates welded or otherwise secured together and to the center sill. The hoppers are provided with center dump openings having inclined doors 6 controlled by linkage 7, and a shaft 8 pivotally supported in bracket 9 formed integral with and depending from the center sill. The shaft 8 may be rotated by means of a hand crank (not shown) projecting sidewardly from the car or may be power operated. The underframe is supported at each end upon the four-wheel trucks indicated at A.

At each end of the center sill is an integral striking plate 10 and a bracket 11b for carry iron 11 supporting the coupler, the shank portion 11a of which is shown in Figure 8. Immediately inwardly of the striking plate and carry iron are the lugs 12 and 13 for draft gear. The short arms 14 projecting laterally on each side of the center sill are of I-section and at the intersections of these arms with the center sill is the integral center bearing structure 15 having a hollow member 16 projecting upwardly from the bottom wall thereof for reinforcing purposes and for supporting the king pin, not shown.

The intersections of the arms 14 with the center sill are braced by gussets 17, 17a, and 18 arranged for attachment to the underframe diagonal braces 18a. The gusset 17a at one end has pads 17b for mounting a brake cylinder (not shown). At the other end the brake cylinder 18b projects above and is formed integral with the gusset 18. Projecting above the center sill between gussets 17 and 18 is a bracket 19 having bolting lugs 19a for attachment of the air reservoir 19b. Adjacent bracket 19 is the base 20 for the air brake valve 20a. Bracket 19 and base 20 are both formed as integral parts of the cast center sill and bolster structure. Preferably, the brake cylinder will be located at one end only of the car, the bolting pads 17a and the integral cylinder 18b being shown at opposite ends for illustrative purposes.

Secured to each pair of arms 14 is the built-up bolster structure including the vertical panel 21 reinforced on the bottom and on each side by plates 22, bottom bars 23, and vertical strut bars 24, panel 21 being bent over at the top for reinforcement and to form a supporting flange for the sloping end floor. The two center vertical bars 24 are secured to the flanges 14a on the bolster arms, the end bars 24 are secured to the channel side sills 25, and the intermediate vertical bars directly connect bottom bars 23 and the bent over top of panel 21. Plates 22 and bars 23 and 24 are firmly secured together and to the bolster arms, side sills, and panel 21 by rivets or welding to form a rigid bolster structure. Side bearings 15a are mounted on the bottom plates 22.

Supported on top of the bolster structure are the inclined webs 26 and 27 forming the sloping end floor of the car. Also supporting the web 26 and serving to attach the same to the center sill is the inclined ledge 28 formed integral with the sill and braced therefrom by ribs 29. Ledge 28 projects laterally from the sides of the center sill and over the top thereof (Figure 10).

Extending across the interior of the center sill at intervals are the ribs 30 and 31 having lugs 32 projecting from their lower portions for attachment and support of the fluid pipe 33. Projecting from the center sill in line with the intermediate ribs 31 between adjacent hoppers are the transverse vertical webs 34 extending the full depth of the center sill and over the top thereof and having flanges 35 rigidly secured to the center sill. Webs 34 are braced along their lower edges by bottom plates 36 secured to flanges 37 and angle bars 38.

Secured to the upper edges of the webs 34 are the hopper end walls 39, 40, 41 and 42. The ribs 31, webs 34, bottom plates 36 and the hopper walls attached to the upper edges of webs 34 form substantial transoms extending across the underframe and are of substantially inverted V-shaped contour for directing lading material into the hoppers.

The portion of the center sill between the bolsters is box-shaped to withstand the vertical loads and longitudinal forces applied thereto and has an upwardly bulged top web 43 of inverted V-shape with downwardly and outwardly tapering sides for clearing lading material from the center sill laterally into the hoppers. This portion of the center sill is thus substantially deeper and stronger than the inverted U-section end portions thereof (Figure 10) which transmit horizontal forces only. The manner of attaching the inner side walls of the hoppers to the sides of the center sill is illustrated in Figure 6 in which integral bead 45 on the center sill abuts the top edge of the hopper side wall 44 for protecting the same and providing a smooth dumping surface. Wall 44 is braced adjacent to the center sill by ribs 46 which rest on the ledge 1a on the center sill. Each of the hopper end walls 39, 40, 41 and 42 is secured to and supported from the center sill by means of an inclined integral ledge 47 projecting laterally from the oppositely inclined top wall elements of the center sill and braced by diagonal ribs 48.

In Figures 11 to 15 is shown a modified center sill which is formed as an integral structure extending from end to end of the underframe as in the previous form. No integral lateral projections are provided adjacent the center bearing reinforcement 49. The bolster and framing for supporting the adjacent inclined floor are formed by the panel 50, vertical angle braces 51, and bottom plate 52 braced by angles 53, the structure being secured to the center sill at the sides by means of angles 54. At the bottom the plate 52 is secured to the center sill beneath the center plate reinforcement 49 and between center plate positioning lugs 55. The center plate 56 is secured directly to the plate 52, as are the side bearings 57. The center bearing is further braced by transverse ribs 58, one of which has an integral enlargement 59 forming a draft gear stop.

The intersections between the center sill and bolster are braced by gussets 60 and 61 secured to these members, these gussets being arranged for attactment of the diagonal braces 60a and gusset 61 having pads 61a for mounting a brake cylinder. The air reservoir 62 extends longitudinally on top of the center sill and is integral therewith, the bottom wall of the reservoir forming a substantial part of the center sill top web. Located on top of the reservoir 62 and integral therewith is the base 63 for the air brake valve 63a. The brackets 64 for mounting hopper door operating mechanism are also formed integral with the center sill between the bolsters.

In Figure 15 is shown a portion of one hopper including the side wall 65 secured to the side of the center sill as by welding, the upper edge of this wall being overlapped and protected by the lower edge of the separate inverted V-shaped web 66 secured to the top of the center sill for directing lading laterally into the hoppers.

In Figures 18, 21 and 22 are shown still other means for attaching the hopper inner side walls to the center sill. In Figure 18 the side walls of center sill 67 are recessed as at 68, forming an inward offset or shoulder 69 against which the upper edge of the hopper wall 70 abuts. In Figs. 21 and 22 the side wall of center sill 71 has a bead 72 and a flange 74 opposing shoulder 75 on the bead which abuts the edge of the hopper wall. Wall 76 has bulges 77 at intervals forming lugs which rest upon the flange 74 and provide pockets 78 for receiving the attaching rivets 79.

In Figures 16 and 17, and 19 and 20 are shown modifications of the center plate bracing portions of the center sill. In Figures 16 and 17 the hollow projection 80 on the bottom web 81 of the center sill is braced by ribs 82 and 83 extending to the center plate abutments 84. Formed integral with the rib 83 at its inner end is a transverse member 85 additionally braced by diagonal ribs 86 and forming an inner stop for the draft gear yoke. In Figures 19 and 20 the member 87 is braced by ribs 88 extending to the center plate abutments 89, the draft lugs 90 being formed directly upon the side walls of the center sill. In each of the forms in Figures 16, 17, 19 and 20 the center plate mounting portion of the center sill is adequately reinforced and means are provided for accurately positioning the center plate and securing the same in position independently of the rivets or weld directly securing the center plate to the sill.

In Figures 23 to 25, the bolster arms 91 and 91a, formed integral with the center sill 92, extend the entire width of the underframe. The transversely disposed air reservoir 93 is formed integral with arm 91a and the center sill and reinforces the intersection therebetween and is braced from the bolster arm by ribs 94. The rib 95 projecting diagonally from the body of the reservoir serves for attachment of the diagonal corner brace 96. The brake cylinder 97 is formed integral with and projects above the gusset 98, reinforcing the intersection of arm 91 and the center sill opposite the reservoir 93. Gusset 98 is arranged for attachment of the other corner brace 96. The base 99 for the air brake valve 100 is integral with the center sill between the reservoir and brake cylinder.

By means of the described invention, the center sill which carries the draft and buffing forces on the underframe, is formed as a continuous rigid column which conveniently includes, as integral parts thereof, various brackets, pads, and auxiliary equipment. Welded and riveted seams and joints are thus omitted in this part of the structure, eliminating difficulties due to opening of the seams or loosening of the rivets as well as the machining and fitting of parts necessary in assembling a built-up center sill. The metal is economically distributed to withstand stresses applied to various parts thereof and the cast construction has greater resistance to corrosion than rolled members.

The invention is not limited to the exact forms described but may be modified in various respects as will occur to those skilled in the art. For instance, it would be practicable to locate the integral air reservoir at other points than those shown, or it may be separately formed and secured to the framing, if desired. The exclusive use of all such modifications as come within the scope of the appended claims is contemplated.

I claim:

1. A railway hopper car underframe integral structure including a center sill longitudinal upright member with upper and lower transverse stiffening flanges and with a relatively narrow ledge between the top and bottom of said member projecting therefrom and extending lengthwise of said member substantially throughout the length of the car hopper for protecting the upper edge of a hopper wall.

2. A railway car center sill member having an upright side wall with a downwardly and outwardly inclined projection below the top thereof forming a downwardly facing shoulder for receiving and protecting the upper edge of a hopper wall secured to the center sill and for cooperating with said hopper wall to form a continuous smooth surface.

3. In a railway car, a center sill member having a lateral offset, and a hopper wall having a shoulder at its upper portion resting on said offset, said wall being secured to the side of said member above said offset, there being an opposing offset in the side of said member above said first-mentioned offset and abutting the upper edge of said hopper wall to protect the same.

4. In a railway car, a center sill member having a lateral offset, and a hopper wall having a shoulder resting on said offset, there being an opposing offset on said member above said first mentioned offset and abutting the upper edge of said hopper wall and corresponding in depth to said hopper wall to form a continuous smooth surface between said hopper wall and said member.

5. A railway car center sill vertical web member with a relatively narrow element between the top and bottom of said web inclined downwardly and outwardly and terminating in a downwardly facing ledge corresponding in depth to the thickness of a hopper wall for abutting and protecting the edge of a hopper wall secured to the web below said element.

EDWIN P. MOSES.